US009992371B2

(12) United States Patent
Manda

(10) Patent No.: US 9,992,371 B2
(45) Date of Patent: Jun. 5, 2018

(54) IMAGE FORMING APPARATUS, STORAGE MEDIUM, AND COLOR CONVERSION METHOD

(71) Applicant: KYOCERA Document Solutions Inc., Osaka (JP)

(72) Inventor: Etsuko Manda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 11 days.

(21) Appl. No.: 15/268,785

(22) Filed: Sep. 19, 2016

(65) Prior Publication Data

US 2017/0094098 A1 Mar. 30, 2017

(30) Foreign Application Priority Data

Sep. 25, 2015 (JP) .................................. 2015-188069

(51) Int. Cl.
  *H04N 1/60* (2006.01)
  *H04N 1/62* (2006.01)
  *H04N 1/46* (2006.01)
  *H04N 1/23* (2006.01)

(52) U.S. Cl.
  CPC ......... *H04N 1/2338* (2013.01); *H04N 1/6008* (2013.01); *H04N 1/6019* (2013.01); *H04N 2201/0094* (2013.01)

(58) Field of Classification Search
  None
  See application file for complete search history.

(56) References Cited

U.S. PATENT DOCUMENTS

| 5,734,368 A | * | 3/1998 | Meyers | H04N 1/644 345/593 |
| 5,809,322 A | * | 9/1998 | Akerib | G06F 15/8023 710/33 |
| 6,125,201 A | * | 9/2000 | Zador | H04N 19/63 375/E7.048 |
| 8,749,842 B2 | | 6/2014 | Yamada | |
| 2002/0051147 A1 | * | 5/2002 | Asai | H04N 1/4055 358/1.9 |
| 2004/0032600 A1 | * | 2/2004 | Burns | H04N 1/4055 358/1.9 |

(Continued)

FOREIGN PATENT DOCUMENTS

JP  2011-223198 A  11/2011

*Primary Examiner* — Madelein Nguyen
(74) *Attorney, Agent, or Firm* — Studebaker & Brackett PC

(57) ABSTRACT

An image forming apparatus includes: an economy mode color conversion section that converts, in printing execution in the economy mode by the image forming apparatus, colors of the image based on an economy mode color conversion table; and the economy mode color correction section that corrects at least one of the two colors in the image the colors of which have not yet been converted by the economy mode color conversion section. When Voronoi regions respectively corresponding to the two colors in an economy mode Voronoi diagram are the same regions under condition that Voronoi regions respectively corresponding to the two colors in a normal mode Voronoi diagram are different regions, the economy mode color correction section corrects the at least one of the two colors in a manner such that the Voronoi regions respectively corresponding to the two colors in the economy mode Voronoi diagram become different regions.

1 Claim, 14 Drawing Sheets

(56) References Cited

U.S. PATENT DOCUMENTS

| | | | | |
|---|---|---|---|---|
| 2010/0020107 A1* | 1/2010 | Chui | | G09G 3/005 345/690 |
| 2010/0158359 A1* | 6/2010 | Qiao | | G06K 9/4652 382/164 |
| 2010/0165364 A1* | 7/2010 | Qiao | | H04N 1/603 358/1.9 |
| 2010/0302404 A1* | 12/2010 | Mizukura | | H04N 1/6058 348/222.1 |
| 2011/0181597 A1* | 7/2011 | Cardno | | G06Q 40/04 345/440 |
| 2011/0249281 A1 | 10/2011 | Yamada | | |
| 2012/0039529 A1* | 2/2012 | Rujan | | G06K 7/1417 382/164 |
| 2012/0050370 A1* | 3/2012 | Iritani | | B41J 2/2114 347/15 |
| 2012/0127279 A1* | 5/2012 | Kochi | | G01B 11/24 348/50 |
| 2012/0207487 A1* | 8/2012 | Stelter | | G03G 15/0877 399/27 |
| 2012/0207488 A1* | 8/2012 | Stelter | | G03G 15/0844 399/27 |
| 2012/0207489 A1* | 8/2012 | Stelter | | G03G 15/0856 399/27 |
| 2014/0153056 A1* | 6/2014 | Takagi | | G06F 15/025 358/3.09 |
| 2014/0160214 A1* | 6/2014 | Conesa | | B41M 5/0017 347/101 |
| 2015/0116739 A1* | 4/2015 | Manda | | H04N 1/6002 358/1.9 |
| 2015/0116780 A1* | 4/2015 | Manda | | H04N 1/405 358/3.06 |
| 2016/0040340 A1* | 2/2016 | Goldman | | D05B 19/08 700/138 |
| 2016/0112605 A1* | 4/2016 | Manda | | H04N 1/6016 358/520 |
| 2016/0187199 A1* | 6/2016 | Brunk | | G01J 3/2823 348/89 |
| 2017/0094098 A1* | 3/2017 | Manda | | H04N 1/2338 |
| 2017/0094124 A1* | 3/2017 | Manda | | H04N 1/6027 |
| 2017/0284002 A1* | 10/2017 | Goldman | | D05B 19/08 |

* cited by examiner

IMAGE FORMING APPARATUS, STORAGE MEDIUM, AND COLOR CONVERSION METHOD

INCORPORATION BY REFERENCE

The present application claims priority under 35 U.S.C. § 119 to Japanese Patent Application No. 2015-188069, filed Sep. 25, 2015. The contents of this application are incorporated herein by reference in their entirety.

BACKGROUND

The present disclosure relates to an image forming apparatus, a storage medium, and a color conversion method for converting a color of an image for printing.

There are image forming apparatuses capable of switching between a normal mode and an economy mode to print an image. In the economy mode, toner usage is more reduced than in the normal mode. When printing is executed in the normal mode, the image forming apparatus prints an image a color of which has been converted based on a color conversion table for the normal mode. On the other hand, when printing is executed in the economy mode, the image forming apparatus prints an image a color of which has been converted based on a color conversion table for the economy mode. When printing is executed in the economy mode, there is a possibility that it is difficult to make discrimination between two colors of the same hue on a printed matter as a result of the reduced toner usage. Thus, the image forming apparatus can perform color conversion based on the color conversion table for the economy mode in a manner such that the two colors have mutually different hues, avoiding the difficulties in the discrimination between the two colors on the printed matter.

SUMMARY

An image forming apparatus includes an economy mode color conversion section and an economy color correction section. The economy mode color conversion section, in printing execution in the economy mode by the image forming apparatus, converts colors of the image based on an economy mode color conversion table serving as a color conversion table for the economy mode. The economy mode color correction section corrects at least one of the two colors in the image the colors of which have not yet been converted by the economy mode color conversion section. When Voronoi regions respectively corresponding to the two colors in an economy mode Voronoi diagram generated as a Voronoi diagram based on a lattice point of the economy mode color conversion table are the same regions under condition that Voronoi regions respectively corresponding to the two colors in a normal mode Voronoi diagram generated as a Voronoi diagram based on a lattice point of a color conversion table for the normal mode are different regions, the economy mode color correction section corrects the at least one of the two colors in a manner such that the Voronoi regions respectively corresponding to the two colors in the economy mode Voronoi diagram become different regions.

A non-transitory computer-readable storage medium of the present disclosure stores a color conversion program executed by an image forming apparatus being capable of printing an image by switching between a normal mode and an economy mode in which toner usage is more reduced than in the normal mode. The color conversion program causes the image forming apparatus to function as: an economy mode color conversion section and an economy mode color correction section. The economy mode color conversion section, in printing execution in the economy mode by the image forming apparatus, converts colors of the image based on an economy mode color conversion table serving as a color conversion table for the economy mode. The economy mode color correction section corrects at least one of the two colors in the image the colors of which have not yet been converted by the economy mode color conversion section. When Voronoi regions respectively corresponding to the two colors in an economy mode Voronoi diagram generated as a Voronoi diagram based on a lattice point of the economy mode color conversion table are the same regions under condition that Voronoi regions respectively corresponding to the two colors in a normal mode Voronoi diagram serving as a Voronoi diagram based on a lattice point of a color conversion table for the normal mode are different regions, the economy mode color correction section corrects the at least one of the two colors in a manner such that the Voronoi regions respectively corresponding to the two colors in the economy mode Voronoi diagram become different regions.

A color conversion method of the present disclosure is executed by an image forming apparatus being capable of printing an image by switching between a normal mode and an economy mode in which toner usage is more reduced than in the normal mode. The color conversion method includes: in printing execution in the economy mode by the image forming apparatus, converting colors of the image based on an economy mode color conversion table serving as a color conversion table for the economy mode; and correcting at least one of the two colors in the image the colors of which have not yet been converted by the economy mode color conversion. When Voronoi regions respectively corresponding to the two colors in an economy mode Voronoi diagram generated as a Voronoi diagram based on a lattice point of the economy mode color conversion table are the same regions under condition that Voronoi regions respectively corresponding to the two colors in a normal mode Voronoi diagram generated as a Voronoi diagram based on a lattice point of a color conversion table for the normal mode are different regions, the at least one of the two colors is corrected in a manner such that the Voronoi regions respectively corresponding to the two colors in the economy mode Voronoi diagram become different regions.

DETAILED DESCRIPTION

Hereinafter, one embodiment of the present disclosure will be described with reference to the drawings.

First, configuration of an multifunction peripheral (MFP) as an image forming apparatus according to the present embodiment will be described.

Figure 1:
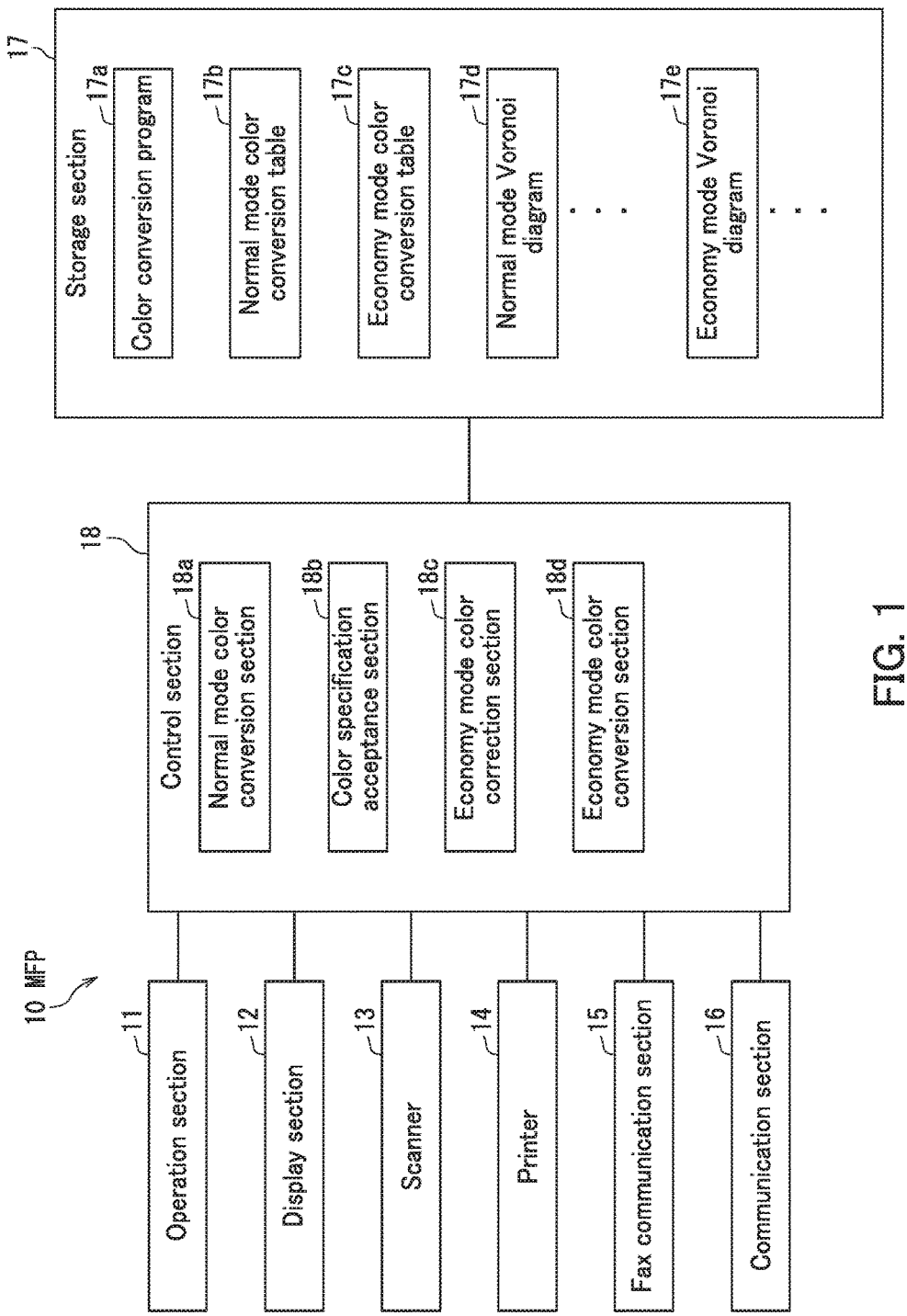
FIG. 1 is a block diagram of an MFP according to one embodiment of the present disclosure.
Figure 2:
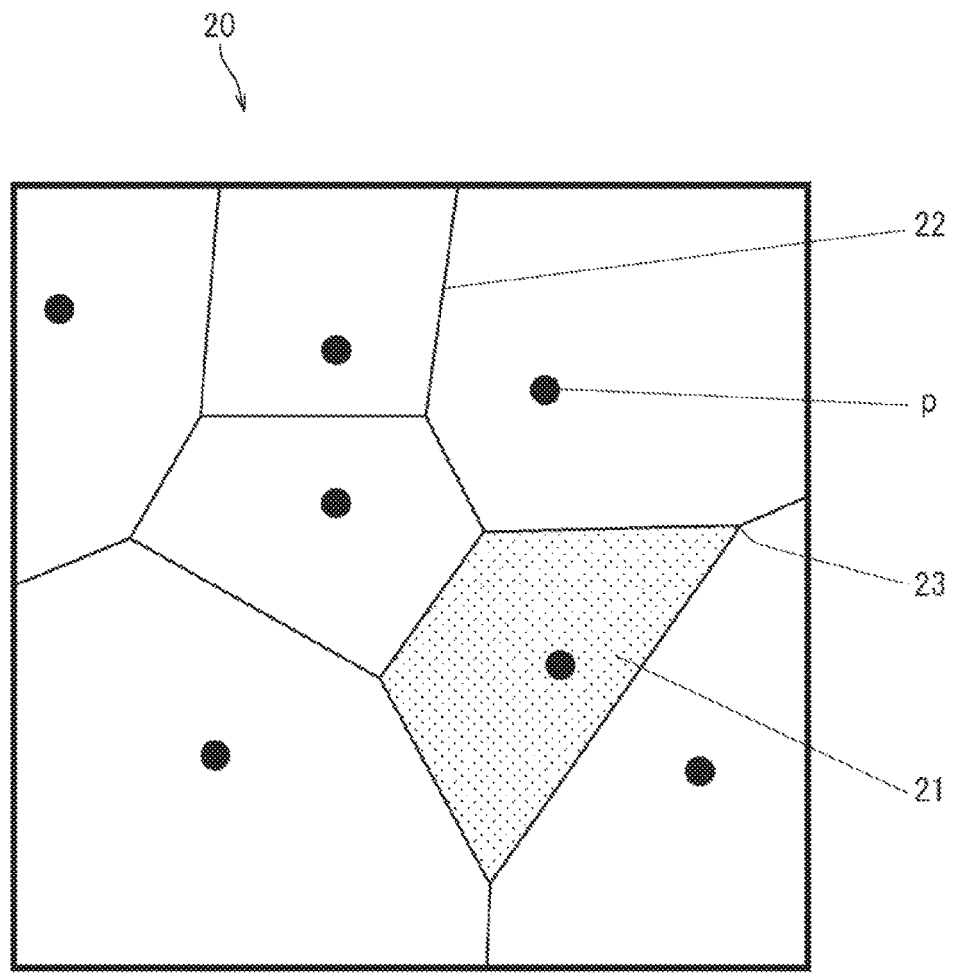
FIG. 2 is a diagram illustrating one example of a Voronoi diagram generated by the MFP illustrated in FIG. 1.

FIG. 1 is a block diagram of an MFP 10 according to the present disclosure. FIG. 2 is a diagram illustrating one example of a Voronoi diagram generated by the MFP 10 illustrated in FIG. 1.

As illustrated in FIG. 1, the MFP 10 includes: an operation section 11, a display section 12, a scanner 13, a printer 14, a fax communication section 15, a communication section 16, a storage section 17, and a control section 18. The operation section 11 is an input device such as buttons through which various operations are inputted. The display section 12 is a display device such as a liquid crystal display (LCD) that displays various pieces of information. The scanner 13 is a reading device that reads an image. The printer 14 is a printing device that executes printing on a storage medium such as paper. The fax communication section 15 is a fax device that performs fax communication with an external facsimile device, not illustrated, via a communication line such as a public phone line. The communication section 16 is a communication device that makes communication with an external device via the network such as a local area network (LAN) or the Internet. The storage section 17 is a storage device such as a semiconductor memory or a hard disk drive (HDD) that stores various pieces of data. The control section 18 controls the entire MFP 10.

The MFP 10 is capable of printing an image through switching between a normal mode and an economy mode in which toner usage is more reduced than in the normal mode.

The storage section 17 stores a color conversion program 17a for converting a color of an image for printing. The color conversion program 17a may be installed in the MFP 10 at a stage of producing the MFP 10, may additionally be installed in the MFP 10 from an external storage medium such as a universal serial bus (USB), or may additionally be installed in the MFP 10 from the network.

The storage section 17 stores a normal mode color conversion table 17b serving as a color conversion table for a normal mode and an economy mode color conversion table 17c serving as a color conversion table for an economy mode. The normal mode color conversion table 17b and the economy mode color conversion table 17c are each lookup tables for "RGB|Lab(Lch)|CMYK". That is, the normal mode color conversion table 17b and the economy mode color conversion table 17c are color tables that indicate correspondence between RGB values, Lab values (Lch values), and CMYK values. The RGB values, the Lab values (Lch values), and the CMYK values included in the normal mode color conversion table 17b and the economy mode color conversion table 17c are designed values.

The storage section 17 can store a plurality of normal mode Voronoi diagrams 17d and a plurality of economy mode Voronoi diagrams 17e. The normal mode Voronoi diagram 17d is a Voronoi diagram based on the Lab value (the Lch value) at a corresponding lattice point of the normal mode color conversion table 17b. The economy mode Voronoi diagram 17e is a Voronoi diagram based on the Lab value (the Lch value) at a corresponding lattice point of the economy mode color conversion table 17c.

The Voronoi diagram here is obtained by partitioning, with hyperplanes such as lines and planes, space closest from each point included in points present in space, as illustrated in FIG. 2. A diagram 20 illustrated in FIG. 2 shows a case where the space is two-dimensional. In case of three-dimensional space such as RGB, the Voronoi diagram 20 is such a diagram that is obtained by three-dimensionally enlarging the Voronoi diagram 20. The Voronoi diagram is defined by an aggregation of Voronoi regions $\{V(p_1), V(p_2), \ldots, V(p_n)\}$ with respect to an aggregation of finite portions $P=\{p_1, p_2, \ldots, p_n\}$ within distance space. A Voronoi region is a region $V(p_i)$ formed by FIG. 1 with respect to a distance function d.

$$V(p_i)=\{p|d(p,p_i) \leq d(p,p_j), i \neq j\}$$ [FIG. 1]

As illustrated in FIG. 2, the diagram 20 includes a plurality of Voronoi regions 21. The diagram 20 is obtained by partitioning, with lines, space closest from each generating point p present in space. One Voronoi region 21 includes only one generating point p. A boundary between the Voronoi regions 21 is called a Voronoi side 22. An intersection between the Voronoi sides 22 is called a Voronoi point 23.

Figure 3:
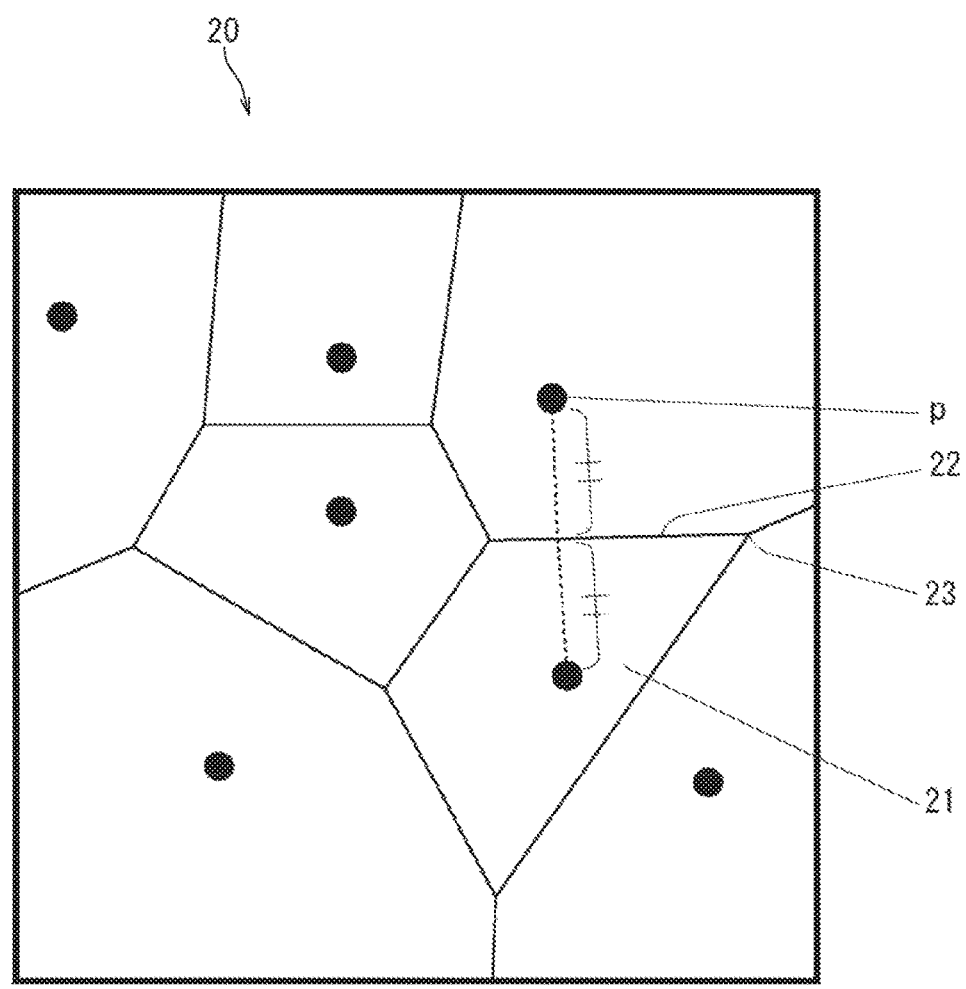
FIG. 3 is a diagram illustrating one characteristic of the Voronoi diagram illustrated in FIG. 2.
Figure 4:
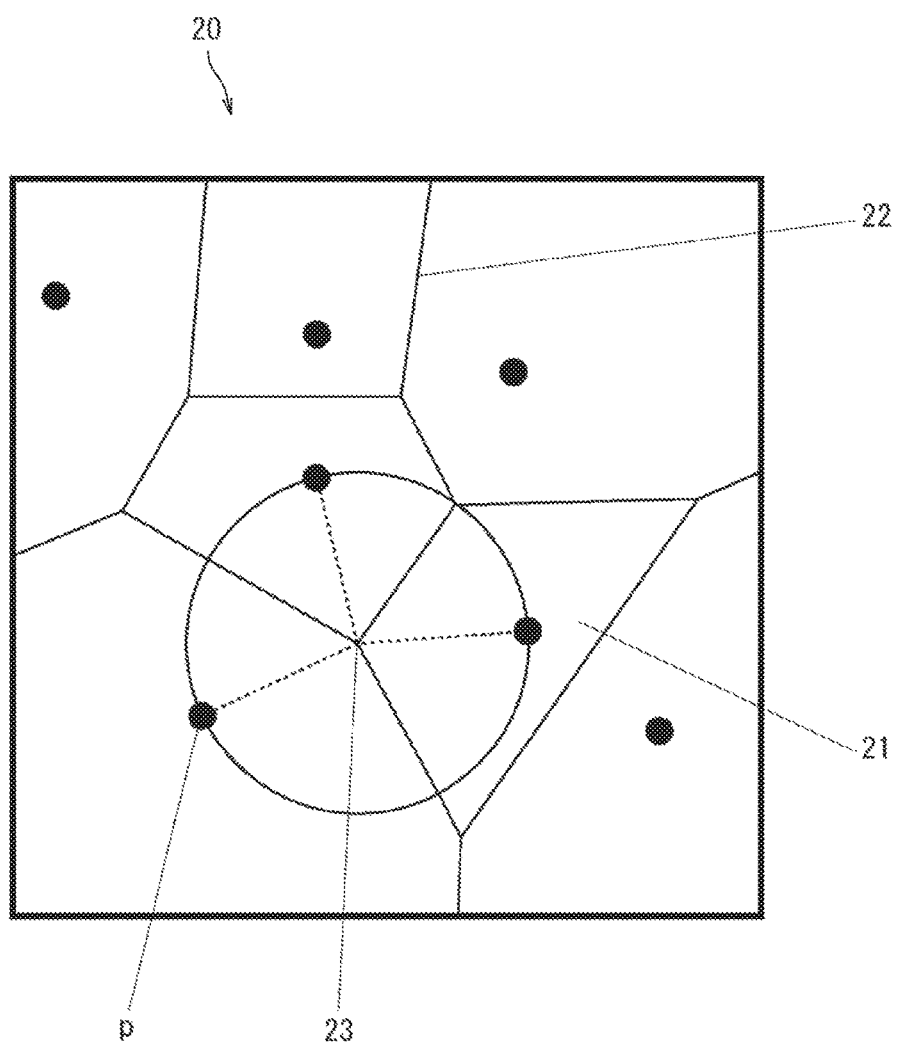
FIG. 4 is a diagram illustrating one characteristic of the Voronoi diagram illustrated in FIG. 2 other than the characteristic illustrated in FIG. 3.

FIG. 3 is a diagram illustrating one characteristic of the diagram 20 illustrated in FIG. 2. FIG. 4 is a diagram illustrating one characteristic of the diagram 20 illustrated in FIG. 2 other than the characteristic illustrated in FIG. 3.

The Voronoi diagram 20, as illustrated in FIG. 3, is characterized such that a perpendicular bisector of the mutually adjacent two generating points is the Voronoi side 22. The diagram 20, as illustrated in FIG. 4, is also characterized such that a center of a circle passing through the mutually adjacent three generating points p is the Voronoi point 23.

The control section 18 includes: for example, a central processing unit (CPU); a read only memory (ROM) that stores various programs and pieces of data; and a random access memory (RAM) that is used as a working area of the CPU. The CPU executes programs stored in the ROM or the storage section 17.

The control section 18 executes the color conversion program 17a stored in the storage section 17 to function as a normal mode color conversion section 18a, a color specification acceptance section 18b, an economy mode color correction section 18c, and an economy mode color conversion section 18d. The normal mode color conversion section 18a converts a color of an image according to the normal mode color conversion table 17b when the MFP 10 executes printing in the normal mode. The color specification acceptance section 18b accepts specification of two colors focused by the user. The economy mode color correction section 18c corrects one of the two colors in the image when the MFP 10 executes printing in the economy mode. The economy mode color conversion section 18d converts a color of an image according to the economy mode color conversion table 17c when the MFP 10 executes printing in the economy mode.

Next, operation of the MFP 10 will be described.

First, the operation performed by the MFP 10 to generate a Voronoi diagram will be described.

Figure 5:
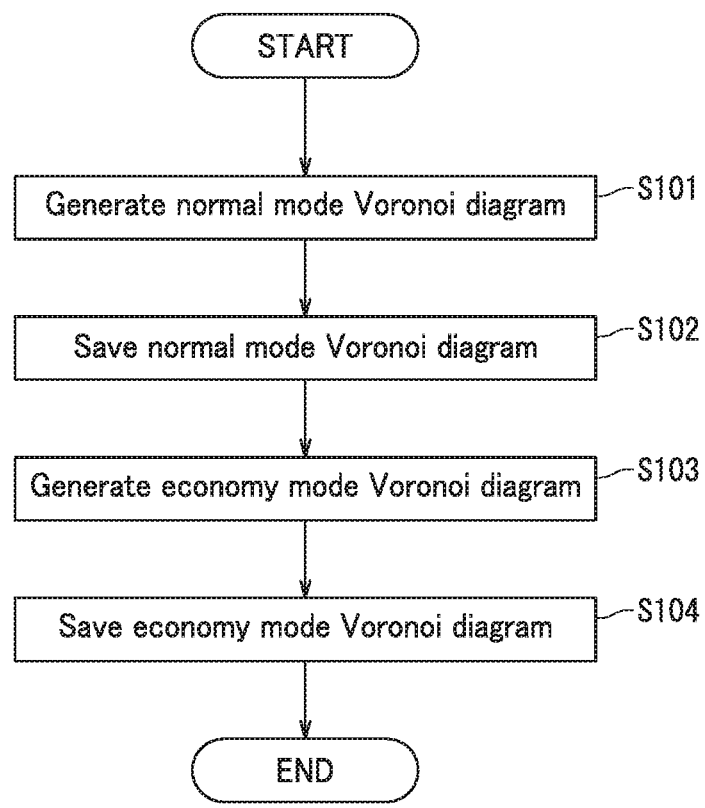
FIG. 5 is a flowchart of operation performed by the MFP illustrated in FIG. 1 to generate a Voronoi diagram.

FIG. 5 is a flowchart of the operation performed by the MFP 10 to generate a Voronoi diagram.

As illustrated in FIG. 5, the control section 18 generates a normal mode Voronoi diagram based on a Lab value (Lch value) at a corresponding lattice point of the normal mode color conversion table 17b (S101). Here, the control section 18 generates a normal mode Voronoi diagram for each of 48 ranges obtained by equally dividing a full gamut based on hues. The control section 18 generates a Voronoi diagram of the middle hue in each range as a normal mode Voronoi diagram in the aforementioned range. That is, the control section 18, for every lattice point, in each range, included in the lattice points of the normal mode color conversion table 17b, obtains a point which has the same intensity and saturation as those of the aforementioned lattice point and which has the middle hue in the aforementioned range. Then the control section 18 provides the obtained point as a generating point of the normal mode Voronoi diagram in the aforementioned range.

Next, the control section 18 saves, into the storage section 17, the 48 normal mode Voronoi diagrams generated in S101 respectively as normal mode Voronoi diagrams 17d.

Next, the control section 18 generates an economy mode Voronoi diagram based on a Lab value (Lch value) at a corresponding lattice point of the economy mode color conversion table 17c (S103). Here, the control section 18 generates the economy mode Voronoi diagram for each of 48 ranges obtained by equally dividing a full gamut based on hues. The control section 18 generates a Voronoi diagram of a middle hue in each range as the economy mode Voronoi diagram in the aforementioned range. Specifically, the control section 18, for every lattice point, in each range, included in lattice points of the economy mode color conversion table 17c, obtains a point which has the same intensity and saturation as those of the aforementioned lattice point and which has the middle hue in the aforementioned range. Then the control section 18 provides the obtained point as a generating point of the economy mode Voronoi diagram in the aforementioned range. Note that the control section 18 divides the full gamut into equal ranges based on the hues by the processing of S101 and the processing of S103.

Next, the control section 18 saves, into the storage section 17, the 48 economy mode Voronoi diagrams generated in S103 respectively as the economy mode Voronoi diagrams 17e (S104). Then the control section 18 ends the operation of the MFP 10 illustrated in FIG. 5.

Next, the operation performed by the MFP 10 to print an image will be described.

Figure 6:
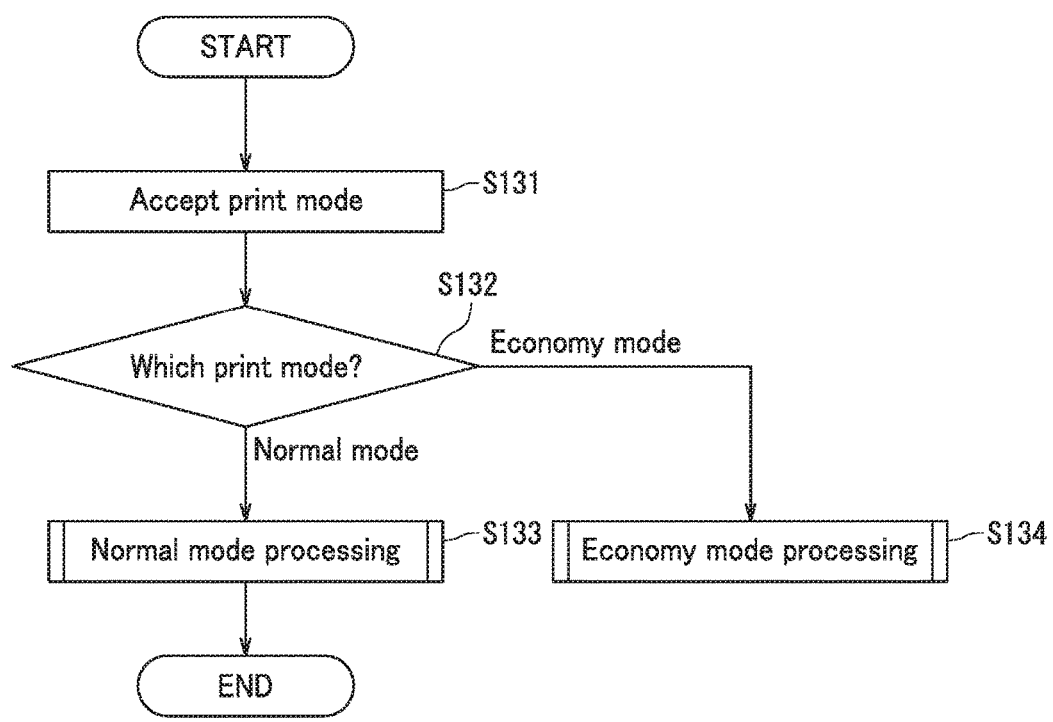
FIG. 6 is a flowchart of operation performed by the MFP illustrated in FIG. 1 to print an image.

FIG. 6 is a flowchart of the operation performed by the MFP 10 to print an image.

As illustrated in FIG. 6, the control section 18 accepts specification of either the normal mode or the economy mode as a print mode for a target image (S131).

Here, the user can input, into the MFP 10 via the operation section 11 or the communication section 16, the print mode for the target image before the operation illustrated in FIG. 6. Therefore, in S131, the control section 18 can accept the mode inputted via the operation section 11 or the communication section 16 before the operation illustrated in FIG. 6. For example, when the user inputs print data of the target image into the MFP 10 from a computer such as a personal computer (PC), a control section of the computer accepts specification of either the normal mode or the economy mode by the user via an operation section of the computer. Then the control section of the computer can include the specified mode in the print data. When the mode is included in the print data inputted via the communication section 16, the control section 18 accepts the mode included in the print data in S131.

Moreover, the control section 18 may make inquiries of the print mode for the target image to the user via the display section 12 or the communication section 16 and then accept the mode specified by the user via the operation section 11 or the communication section 16. For example, when the user has inputted the print data for the target image into the MFP 10 via the computer such as the PC, the control section 18 makes inquiries to the user, by a display section of the computer via the communication section 16, on whether the mode is the normal mode or the economy mode. Then the control section 18 may accept, via the communication section 16, the mode specified by the user by the operation section of the computer.

After the processing of S131, the control section 18 judges the mode accepted in S131 (S132).

Figure 7:
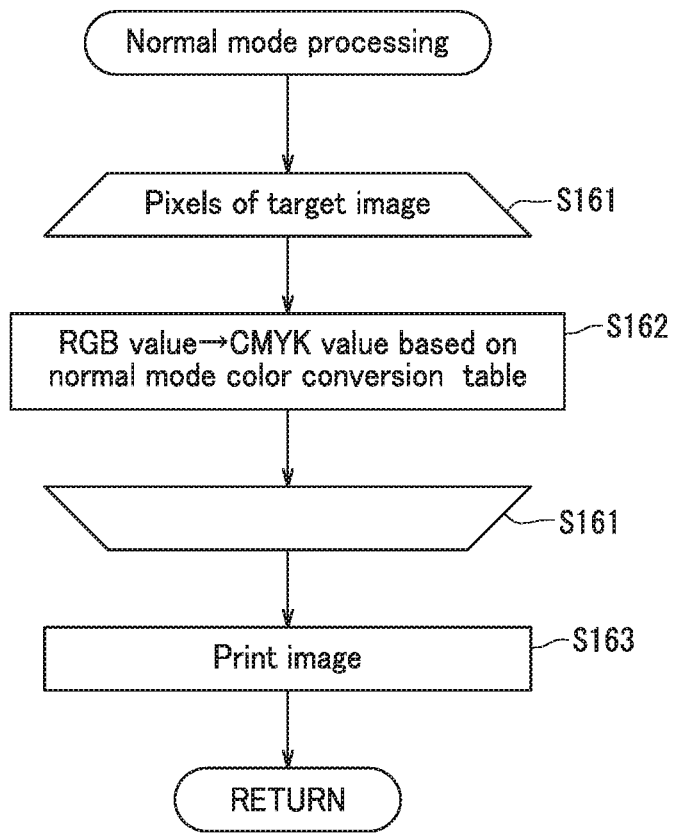
FIG. 7 is a flowchart of normal mode processing illustrated in FIG. 6.

When it is judged in S132 that the normal mode has been specified, the control section 18 executes normal mode processing illustrated in FIG. 7 (S133).

FIG. 7 is a flowchart of the normal mode processing illustrated in FIG. 6.

As illustrated in FIG. 7, the normal mode color conversion section 18a of the control section 18 repeats processing of S162 to be described later on for each of pixels of the target image (S161).

In the processing of S162, an RGB value of the target pixel included in the pixels of the target image is converted into a CMYK value based on the normal mode color conversion table 17b. Note that, for an RGB value not included in the normal mode color conversion table 17b, the normal mode color conversion section 18a converts the RGB value into a CMYK value by interpolation calculation based on the RGB value included in the normal mode color conversion table 17b and a CMYK value corresponding to the aforementioned RGB value in the normal mode color conversion table 17b.

Next, the control section 18 prints, on a storage medium by the printer 14, the image all the pixels of which have been converted from the respective RGB values into the respective CMYK values by the processing of S161 and S162 (S163). Then the control section 18 ends the normal mode processing illustrated in FIG. 7.

As illustrated in FIG. 6, when the normal mode processing in S133 ends, the control section 18 ends the operation of the MFP 10 illustrated in FIG. 6.

Figure 8:
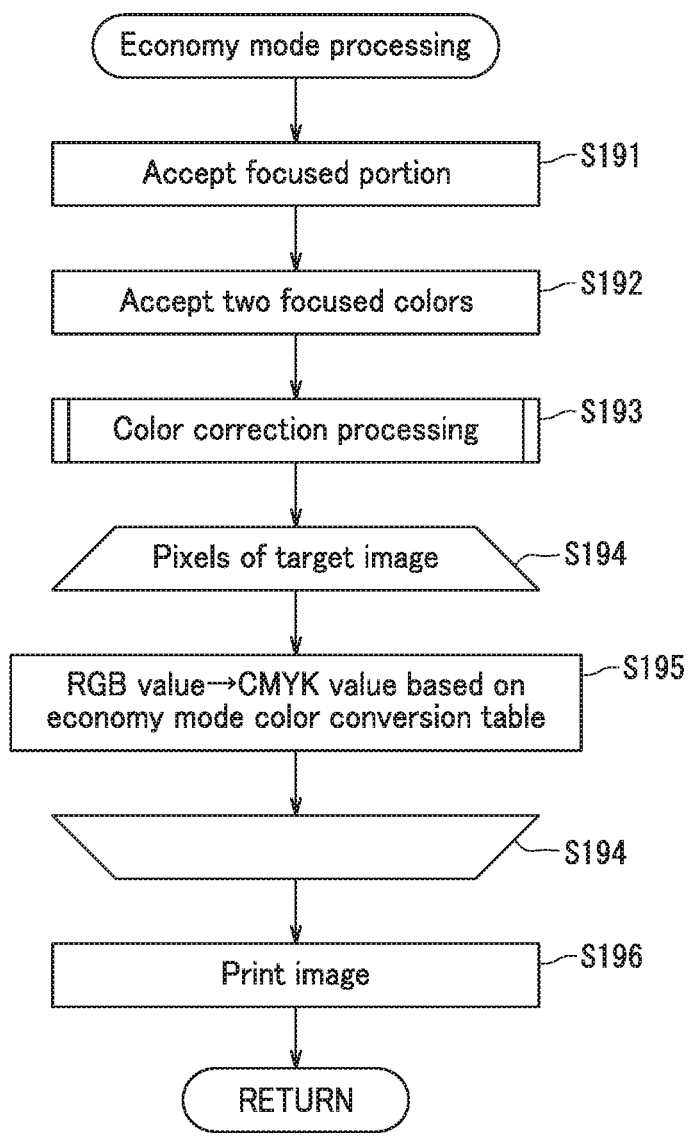
FIG. 8 is a flowchart of economy mode processing illustrated in FIG. 6.

When it is judged in S132 that the economy mode has been specified, the control section 18 executes the economy mode processing illustrated in FIG. 8 (S134).

FIG. 8 is a flowchart of the economy mode processing illustrated in FIG. 6.

As illustrated in FIG. 8, the control section 18 accepts specification of a portion which is included in the target image and which is focused by the user, that is, a focused portion (S191). In the present embodiment, the color specification acceptance section 18b of the control section 18 accepts the specification of the focused portion.

Here, the user can input, into the MFP 10 via the operation section 11 or the communication section 16, the specification of the focused portion of the target image before the operation illustrated in FIG. 6. Therefore, the control section 18 can accept, in S191, the specification inputted via the operation section 11 or the communication section 16 before the operation illustrated in FIG. 6. For example, when the user inputs print data for the target image into the MFP 10 from the computer such as the PC, the control section of the computer receives specification of the focused portion of the target image by the user via the operation section of the computer. Then the control section of the computer can include, in the print data, information indicating the specified focused portion. When the information indicating the focused portion is included in the print data inputted via the communication section 16, the control section 18 accepts, in S191, the focused portion indicated by the information included in the print data.

Moreover, in S191, the control section 18 may make inquiries of specification of the focused portion of the target image to the user via the display section 12 or the communication section 16 and then accept the focused portion specified by the user via the operation section 11 or the communication section 16. For example, when the user has inputted print data of the target image into the MFP 10 from the computer such as the PC, the control section 18 makes inquiries of the focused portion of the target image to the user by the display section of the computer via the communication section 16. Then the control section 18 may accept, via the communication section 16, the focused portion specified by the user by the operation section of the computer.

Note that the focused portion may be specified by, for example, a rectangular region in the target image.

After the processing of S191, the color specification acceptance section 18b of the control section 18 accepts specification of two colors which are included in the focused portion of the target image and which are focused by the user (S192).

Here, the user can input, into the MFP 10 via the operation section 11 or the communication section 16, the two colors in the focused portion of the target image before the operation illustrated in FIG. 6. Therefore, the color specification acceptance section 18b can accept, in S192, the specification inputted via the operation section 11 or the communication section 16 before the operation illustrated in FIG. 6. For example, when the user inputs print data of the target image into the MFP 10 from the computer such as the PC, the control section of the computer receives specification of the two colors in the focused portion of the target image by the user via the operation section of the computer. Then the control section of the computer can include information indicating the specified two colors in the print data. When the print data inputted via the communication section 16 includes the information indicating the two colors in the focused portion of the target image, the control section 18 accepts the two colors indicated by the information included in the print data in S192.

Moreover, the color specification acceptance section 18b may make inquiries of specification of the two colors in the focused portion of the target image to the user via the display section 12 or the communication section 16 and then accept the two colors specified by the user via the operation section 11 or the communication section 16. For example, when the user has inputted print data of the target image into the MFP 10 from the computer such as the PC, the control section 18 makes inquiries of the two colors in the focused portion of the target image to the user by the display section of the computer via the communication section 16. Then the control section 18 may accept, via the communication section 16, the two colors specified by the user by the operation section of the computer.

Note that, when the color specification acceptance section 18b accepts the specification of the two colors in S192, the color specification acceptance section 18b accepts the specification of one of the two colors as a reference color and accepts the specification of another one of the colors as a candidate corrected color.

After the processing of S192, the economy mode color correction section 18c of the control section 18 executes color correction processing for correcting the candidate corrected color accepted in S192 when necessary (S193). That is, the economy mode color correction section 18c corrects at least one of the two colors the specification of which has been accepted by the color specification acceptance section 18b. More specifically, when the Voronoi regions respectively corresponding to the two colors in the economy mode Voronoi diagram 17e are the same regions under condition that the Voronoi regions respectively corresponding to the two colors in the normal mode Voronoi diagram 17d are different regions, the economy mode color correction section 18c corrects at least one of the two colors in a manner such that the Voronoi regions respectively corresponding to the two colors in the economy mode Voronoi diagram 17e become different regions. In the present embodiment, the economy mode color correction section 18c corrects the candidate corrected color in the image the color of which has not yet been converted by the economy mode color conversion section 18d.

Figure 9A:
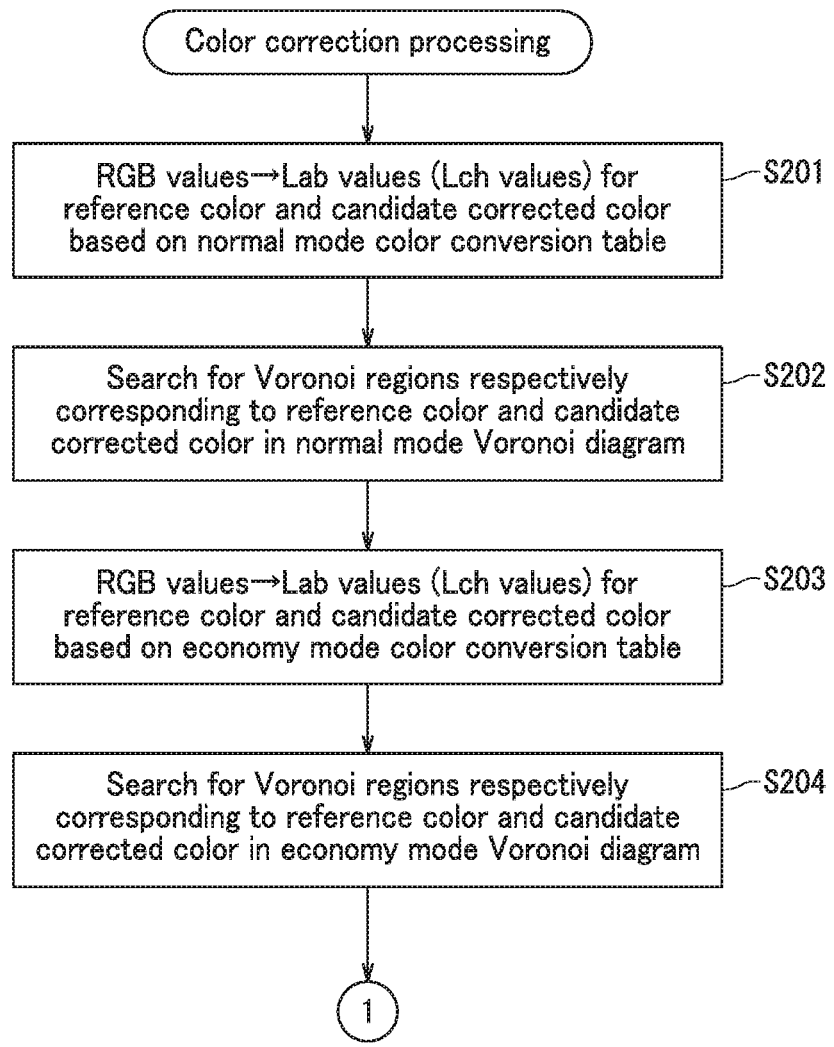
FIG. 9A is a former stage of the flowchart of color correction processing illustrated in FIG. 8.
Figure 9B:
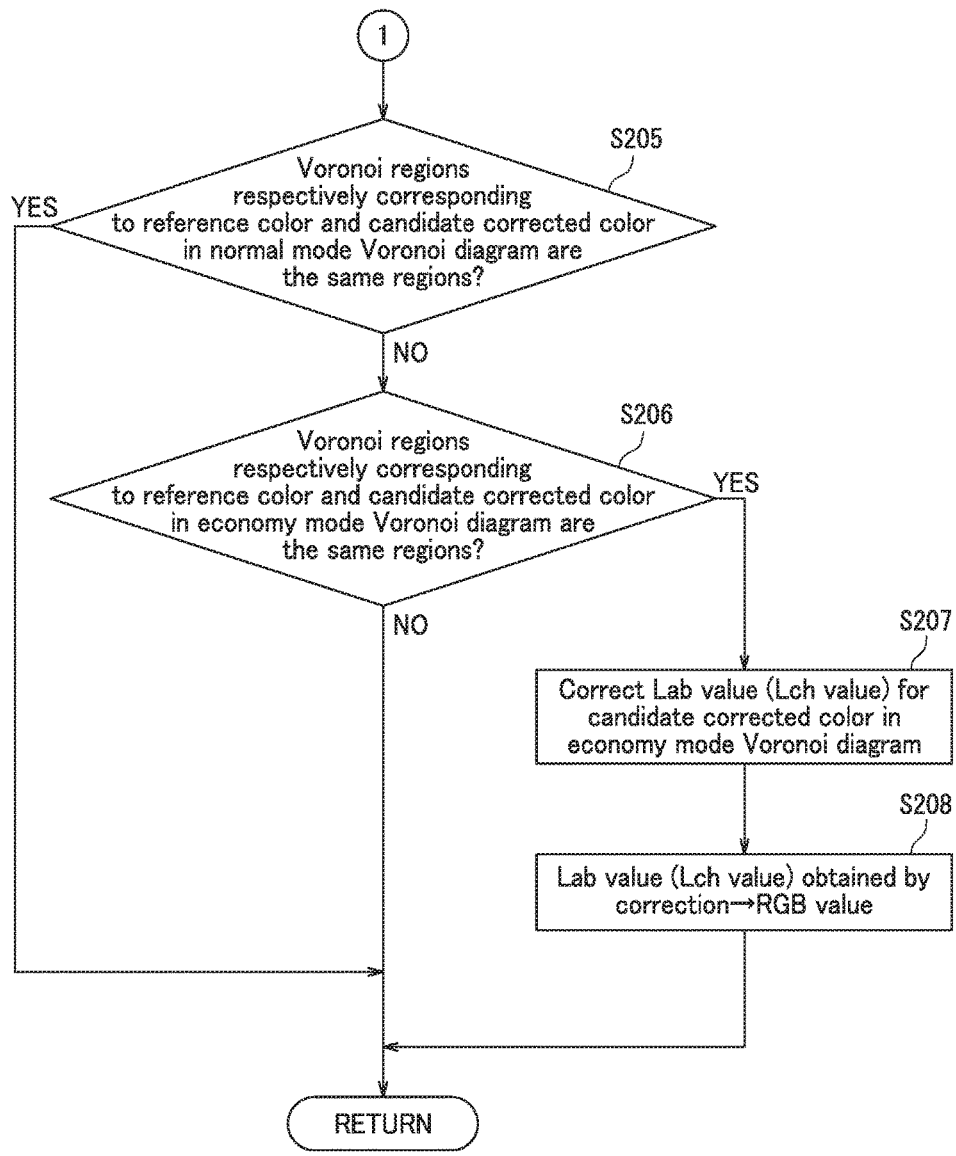
FIG. 9B is a later stage of the flowchart of the color correction processing illustrated in FIG. 8.

FIG. 9A is a former stage of a flowchart of the color correction processing illustrated in FIG. 8. FIG. 9B is a later stage of the flowchart of the color correction processing illustrated in FIG. 8.

As illustrated in FIG. 9A, the economy mode color correction section 18c converts RGB values of the reference color and the candidate corrected color accepted by the color specification acceptance section 18b in S192 into Lab values (Lch values), based on the normal mode color conversion table 17b (S201). For an RGB value not included in the normal mode color conversion table 17b, the economy mode color correction section 18c converts the RGB value into a Lab value (Lch value) by interpolation calculation based on the RGB value included in the normal mode color conversion table 17b and the Lab value (Lch value) corresponding to the aforementioned RGB value in the normal mode color conversion table 17b.

After processing of S201, the economy mode color correction section 18c searches for the Voronoi regions in the normal mode Voronoi diagram 17d respectively corresponding to the reference color and the candidate corrected color that have been converted into Lab values (Lch values) in S201 (S202). That is, the economy mode color correction section 18c confirms whether or not the reference color is included in any of the 48 ranges obtained by the division by the processing of S101. Then the economy mode color correction section 18c performs search to see whether or not a point having the same intensity and saturation as those of the reference color and located on the middle hue in the range including the reference color is included in any of the Voronoi regions of the normal mode Voronoi diagrams 17d in the aforementioned range. Then the economy mode color correction section 18c defines the searched Voronoi region as the Voronoi region corresponding to the reference color in the normal mode Voronoi diagrams 17d. The reference color has been described above, and the same also applies to the candidate corrected color.

The economy mode color correction section 18c converts the RGB values of the reference color and the candidate corrected color accepted in S192 into Lab values (Lch values) based on the economy mode color conversion table 17c (S203). For an RGB value not included in the economy mode color conversion table 17c, the economy mode color correction section 18c converts the RGB value into a Lab value (Lch value) by interpolation calculation based on the RGB value included in the economy mode color conversion table 17c and the Lab value (Lch value) corresponding to the aforementioned RGB value in the economy mode color conversion table 17c.

After processing of S203, the eco-mod color correction section 18c searches for the Voronoi regions, in the economy mode Voronoi diagrams 17e, respectively corresponding to the reference color and the candidate corrected color that have been converted into the Lab values (Lch values) in S203 (S204). That is, the economy mode color correction section 18c confirms whether or not the reference color is included in any of the 48 ranges obtained by the division by the processing of S101. Then the economy mode color correction section 18c performs search to see whether or not a point having the same intensity and saturation as those of the reference color and located on the middle hue in the range including the reference color is included in any of the Voronoi regions of the economy mode Voronoi diagram 17e in the aforementioned range. Then the economy mode color correction section 18c provides the searched Voronoi region as the Voronoi region corresponding to the reference color in the economy mode Voronoi diagram 17e. The reference color has been described above, but the same also applies to the candidate corrected color.

Next, as illustrated in FIG. 9B, the economy mode color correction section 18c judges whether or not the two Voronoi regions searched in 202, that is, the Voronoi regions corresponding to the reference color and the candidate corrected color in the normal mode Voronoi diagrams 17d are the same regions (S205).

Figure 10:
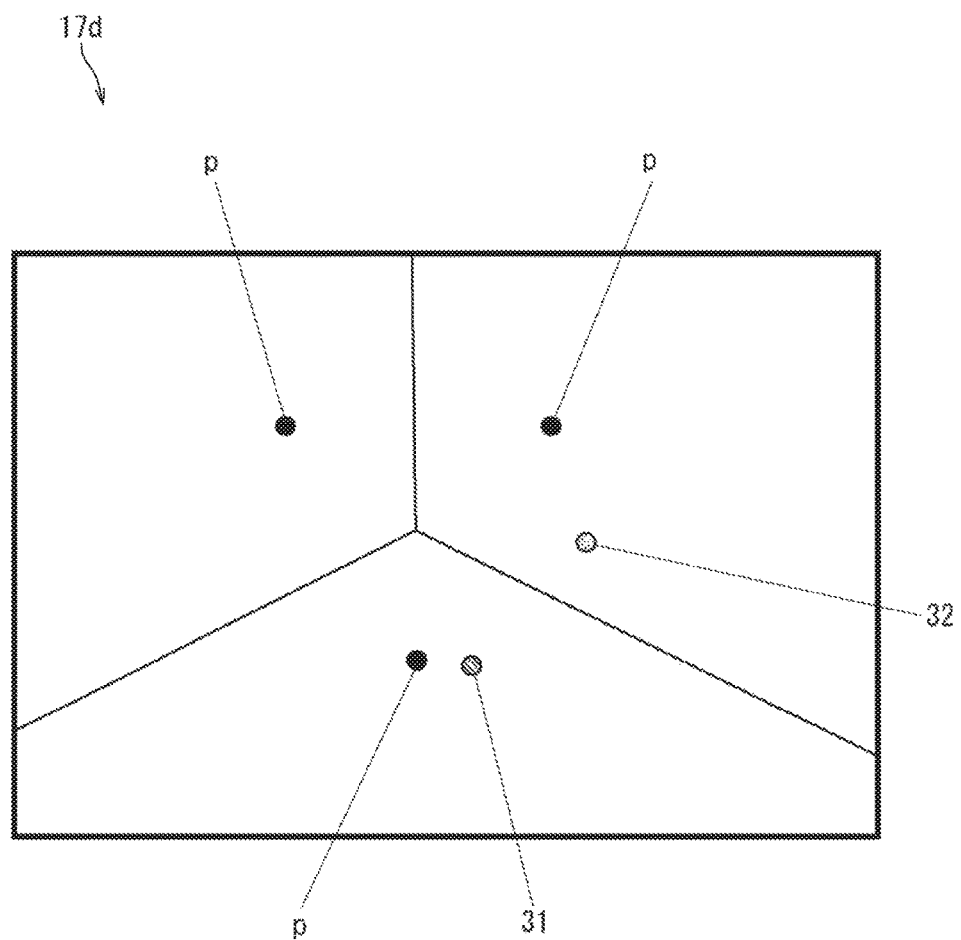
FIG. 10 is a diagram illustrating one example of part of a normal mode Voronoi diagram illustrated in FIG. 1.

FIG. 10 is a diagram illustrating one example of part of the normal mode Voronoi diagram illustrated in FIG. 1.

For example, in the normal mode Voronoi diagram 17d illustrated in FIG. 10, a Voronoi region including a point 31 and corresponding to the reference color and a Voronoi region including a point 32 and corresponding to the candidate corrected color are different regions.

As illustrated in FIG. 9B, upon judgment in S205 that the Voronoi regions respectively corresponding to the reference color and the candidate corrected color in the normal mode Voronoi diagram 17d are not the same, the economy mode color correction section 18c judges whether or not the two Voronoi regions searched in S204, that is, the Voronoi regions respectively corresponding to the reference color and the candidate corrected color in the economy mode Voronoi diagram 17e are the same regions (S206).

Figure 11:
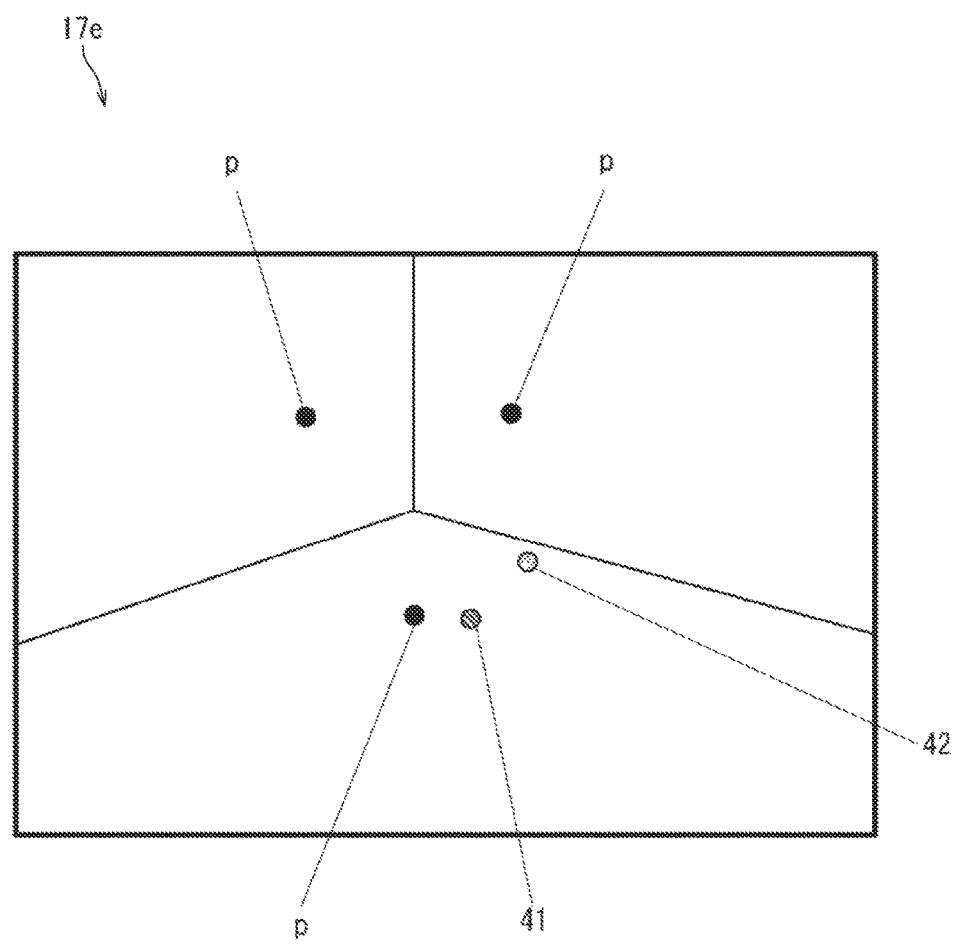
FIG. 11 is a diagram illustrating one example of part of an economy mode Voronoi diagram illustrated in FIG. 1.

FIG. 11 is a diagram illustrating one example of part of the economy mode Voronoi diagram illustrated in FIG. 1.

For example, in the economy mode Voronoi diagram 17e illustrated in FIG. 11, a Voronoi region including a point 41 and corresponding to the reference color and a Voronoi region including a point 42 and corresponding to the candidate corrected color are the same regions.

When it is judged in S206 that the Voronoi regions respectively corresponding to the reference color and the candidate corrected color in the economy mode Voronoi diagram 17e are the same regions, the economy mode color correction section 18c corrects the Lab value (Lch value) of the candidate corrected color in the economy mode Voronoi diagram 17e.

Figure 12:
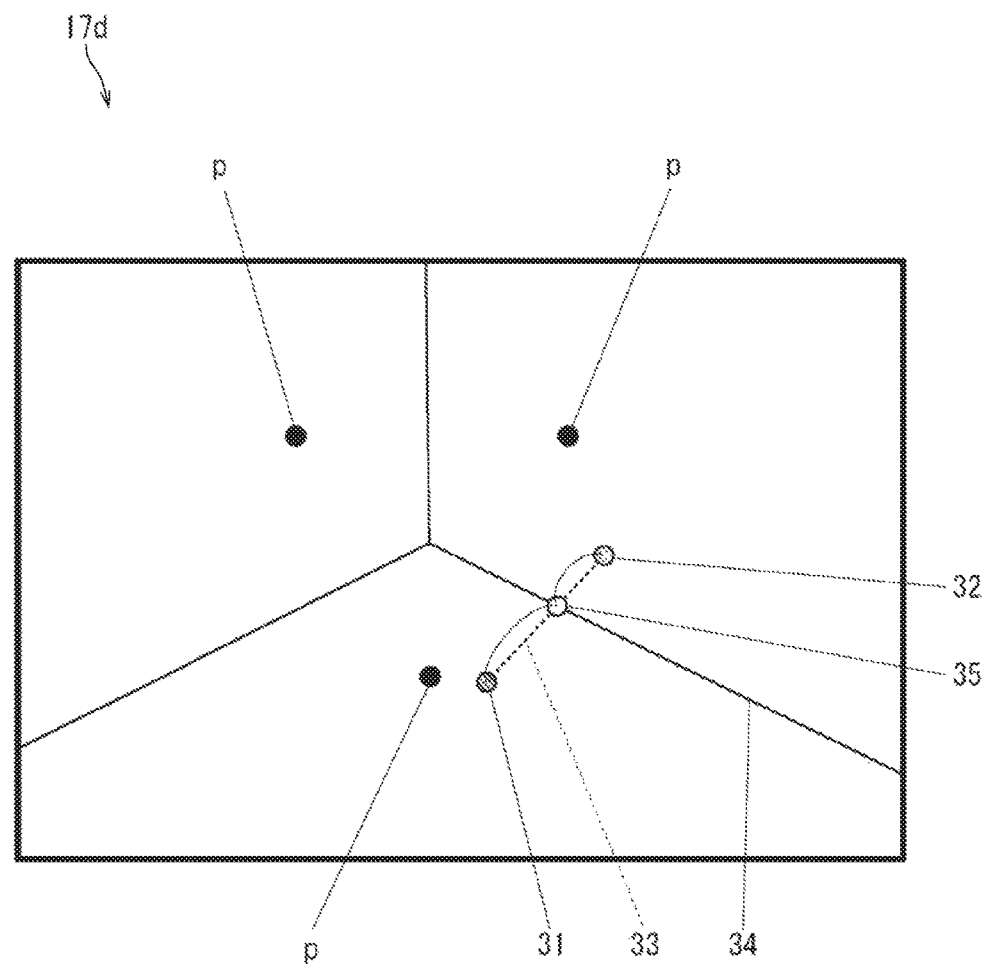
FIG. 12 is a diagram illustrating the normal mode Voronoi diagram illustrated in FIG. 10 in a process of correcting a candidate corrected color.

FIG. 12 is a diagram illustrating the normal mode Voronoi diagram illustrated in FIG. 10 in a process of correcting the candidate corrected color.

More specifically, the economy mode color correction section 18c first obtains an intersection 35 between a line 33 linking together the point 31 corresponding to the reference color and the point 32 corresponding to the candidate corrected color and a Voronoi side 34 in the normal mode Voronoi diagram 17d, as illustrated in FIG. 12. Then the economy mode color correction section 18c obtains a dividing ratio of the line 33 by the intersection 35. That is, provided that the points 31 and 32 and the intersection 35 respectively have coordinates of Base_def, Rev_def, and X_def, the dividing ratio of the line 33 by the intersection 35 is expressed as "d(Base_def−X_def): d(X_def−Rev_def)".

Figure 13:
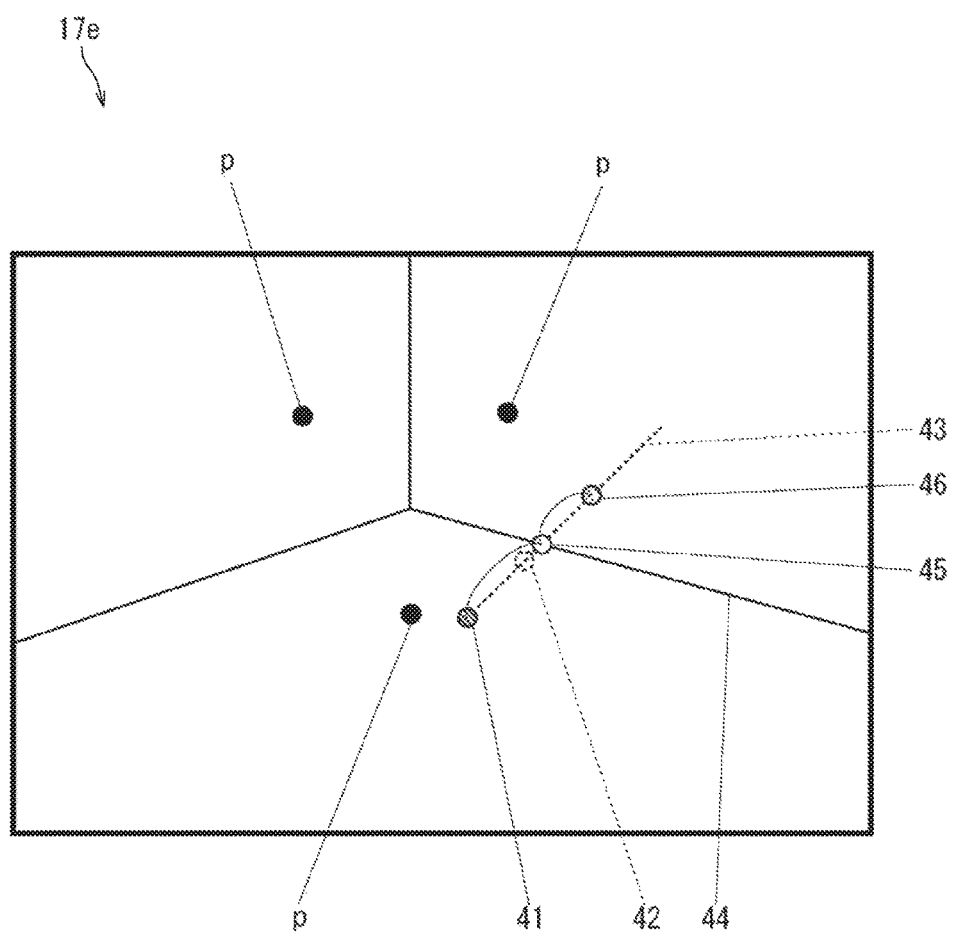
FIG. 13 is a diagram illustrating the economy mode Voronoi diagram illustrated in FIG. 11 in the process of correcting the candidate corrected color.

FIG. 13 is a diagram illustrating the economy mode Voronoi diagram illustrated in FIG. 11 in the process of correcting the candidate corrected color.

Next, the economy mode color correction section 18c obtains an intersection 45 between a straight line 43 passing through the point 41 corresponding to the reference color and the point 42 corresponding to the candidate corrected color and a Voronoi side 44 located on a side closer to the point 42 than to the point 41 in the economy mode Voronoi diagram 17e, as illustrated in FIG. 13. Then provided that coordinates of the point 41 and the intersection 45 are Base_eco and X_eco, respectively, and coordinates of a point 46 corresponding to a color obtained by the correction of the Lab value (Lch value) of the candidate corrected color is Rev'_eco, the economy mode color correction section 18c calculates Rev' eco such that a dividing ratio "d(Base_eco−X_eco):d(X_eco−Rev'_eco)" of a line linking together the point 41 and the point 46 by the intersection 45 becomes equal to "d(Base_def−X_def):d(X_def−Rev_def) described above". Then the economy mode color correction section 18c provides the calculated Rev'_eco as coordinates of the color obtained by the correction of the Lab value (Lch value) of the candidate corrected color.

After processing of S207, the economy mode color correction section 18c converts, into an RGB value, the Lab value (Lch value) obtained by the correction in S207 based on the economy mode color conversion table 17c (S208). For a Lab value (Lch value) not included in the economy mode color conversion table 17c, the economy mode color correction section 18c converts the Lab value (Lch value) into an RGB value by interpolation calculation based on the Lab value (Lch value) included in the economy mode color conversion table 17c and the RGB value corresponding to the aforementioned Lab value (Lch value) in the economy mode color conversion table 17c.

After processing of S208, the economy mode color correction section 18c ends the color correction processing illustrated in FIGS. 9A and 9B.

When it is judged in S205 that the Voronoi regions respectively corresponding to the reference color and the candidate corrected color in the normal mode Voronoi diagram 17d are the same regions when it is judged in S206 that the Voronoi regions respectively corresponding to the reference color and the candidate corrected color in the economy mode Voronoi diagrams 17e are not the same regions, the economy mode color correction section 18c ends the color correction processing illustrated in FIGS. 9A and 9B without executing the processing of S207 and S208.

As illustrated in FIG. 8, when the color correction processing of S193 ends, the economy mode color conversion section 18*d* of the control section 18 repeats processing of S195 to be described later on for each pixel of the target image (S194).

In processing of S195, an RGB value of the target pixel included in pixels of the target image is converted into a CMYK value based on the economy mode color conversion table 17*c*. Here, when the candidate corrected color accepted in S192 has been corrected in S207, the economy mode color conversion section 18*d* uses the RGB value generated in S208 for the pixel of the candidate corrected color which pixel is included in the pixels of the focused portion accepted in S191 and which has been accepted in S192. For an RGB value not included in the economy mode color conversion table 17*c*, the economy mode color conversion section 18*d* converts the RGB value into a CMYK value by interpolation calculation based on the RGB value included in the economy mode color conversion table 17*c* and the CMYK value corresponding to the aforementioned RGB value in the economy mode color conversion table 17*c*.

Next, the control section 18 prints, on the storage medium by the printer 14, the image all pixels of which have been converted from the RGB values into the CMYK values by the processing of S194 and S195 (S196). Then the control section 18 ends the economy mode processing illustrated in FIG. 8.

As illustrated in FIG. 6, when the economy mode processing in S134 ends, the control section 18 ends the operation illustrated in FIG. 6.

As described above, in the printing execution in the economy mode (economy mode in S132), in correspondence with the mutually different Voronoi regions in the normal mode Voronoi diagram 17*d*, the MFP 10 corrects one of the two colors corresponding to the same Voronoi region in the economy mode Voronoi diagram 17*e* (S207). That is, the MFP 10 corrects one of the reference color and the candidate corrected color having the different corresponding Voronoi regions in the normal mode Voronoi diagram 17*d* but having the same corresponding Voronoi region in the economy mode Voronoi diagram 17*e*. Therefore, the Voronoi regions respectively corresponding to the two colors are also made different regions in the economy mode Voronoi diagram 17*e*, and thus even in printing of the two colors in the economy mode according to the same color conversion table, it is possible to suppress difficulties in discrimination between the two colors, which can be achieved on a printed matter printed in the normal mode but cannot be achieved on a printed matter printed in the economy mode. That is, it is possible to suppress the difficulties in the discrimination on the printed matter printed in the economy mode even when the reference color and the candidate corrected color are printed in the economy mode according to the economy mode color conversion table 17*c*. As a result, the MFP 10 can reduce a number of economy mode color conversion tables.

Note that, when the Voronoi regions respectively corresponding to the two colors in the economy mode Voronoi diagram 17*e* are the same regions under condition that the Voronoi regions respectively corresponding to the two colors in the normal mode Voronoi diagram 17*d* are different regions, the MFP 10 may correct both of the two colors in a manner such that the Voronoi regions respectively corresponding to the two colors in the economy mode Voronoi diagram 17*e* become different regions.

In a case where the two colors of the same or similar hues have been printed thinner as a result of more reduced toner usage in the economy mode than in the normal mode, even when discrimination therebetween can be made on a printed matter printed in the normal mode, it is difficult to make discrimination therebetween on a printed matter printed in the economy mode. The two colors included in the mutually different ranges of the 48 ranges obtained by the division of the full gamut based on the hues have the different corresponding economy mode Voronoi diagrams 17*e*, and thus the Voronoi regions respectively corresponding to the two colors are different regions in the economy mode Voronoi diagram 17*e*. Therefore, in printing execution in the economy mode, on the two colors included in the mutually different ranges of the ranges obtained by the division based on the hues, the MFP 10 performs color conversion according to the economy mode color conversion table 17*c* without performing color correction for providing different Voronoi regions respectively corresponding to the two colors in the economy mode Voronoi diagram 17*e* (NO in S206). Specifically, only on the two colors included in the same range of the 48 ranges obtained by the division of the full gamut based on the hues, in a case where the two colors correspond to the mutually different Voronoi regions in the normal mode Voronoi diagram 17*d* and the two colors correspond to the same Voronoi regions in the economy mode Voronoi diagram 17*e*, in printing execution in the economy mode by the MFP 10, the economy mode color correction section 18*c* performs color correction for providing different Voronoi regions respectively corresponding to the two colors in the economy mode Voronoi diagram 17*e*, and the economy mode color conversion section 18*d* of the MFP 10 converts the color corrected according to the economy mode color conversion table 17*c*. That is, in a case where the two colors are included in the same range of the 48 ranges obtained by the division of the full gamut based on the hues, the economy mode color correction section 18*c* corrects at least one of the two colors. Therefore, even when the MFP 10 prints a printed matter thinner as a result of more reduced toner usage in the economy mode than in the normal mode, the MFP 10 does not perform color correction on the two colors that can be discriminated on the printed matter printed in the economy mode. As a result, occurrence of a large difference in image impression on a printed matter between the normal mode and the economy mode can be suppressed.

In the MFP 10, the normal mode Voronoi diagram 17*d* in the present embodiment is planar (two-dimensional) but the normal mode Voronoi diagram 17*d* may be a solid (three-dimensional) Voronoi diagram with a lattice point of the normal mode color conversion table 17*b* directly provided as a generating point. The normal mode Voronoi diagram 17*d* has been described above, and the same also applies to the economy mode Voronoi diagram 17*e*. That is, the economy mode Voronoi diagram 17*e* may be a solid Voronoi diagram with a lattice point of the economy mode color conversion table 17*c* directly provided as a generating point. In a case where the normal mode Voronoi diagram 17*d* is a solid Voronoi diagram, Voronoi regions respectively including the reference color and the candidate corrected color in the normal mode Voronoi diagram 17*d* are searched in S202. In a case where the economy mode Voronoi diagram 17*e* is a solid Voronoi diagram, Voronoi regions respectively including the reference color and the candidate corrected color in the economy mode Voronoi diagram 17*e* are searched in S204. In a case where the normal mode Voronoi diagram 17*d* and the economy mode Voronoi diagram 17*e* are solid Voronoi diagrams, the correction in S207 is also performed based on the solid Voronoi diagrams.

In the MFP 10, the normal mode Voronoi diagram 17*d* and the economy mode Voronoi diagram 17*e* in the present embodiment are divided based on the hues. Note, however, that the normal mode Voronoi diagram 17*d* and the economy mode Voronoi diagram 17*e* may not be divided based on hues.

The MFP 10 accepts specification of the two colors focused by the user. Therefore, it is possible to suppress the difficulties in the discrimination between the two colors focused by the user on a printed matter printed in the economy mode. For example, even in a case where hues of the two colors located adjacently to each other in the graph are equal or similar to each other and the two colors have close shades, it is possible to suppress the difficulties in the discrimination between the two colors on the printed matter printed in the economy mode.

The MFP 10 accepts the specification of the two colors focused by the user. Then the MFP 10 does not perform color correction on any portion of the target image other than the focused portion thereof even in the economy mode. Therefore, the MFP 10 can suppress the occurrence of a large difference in image impression on a printed matter between the normal mode and the economy mode. Note that the MFP 10 may be so configured as to perform correction on at least one of the two colors focused by the user for the entire target image in the economy mode without receiving specification of the focused portion focused by the user.

An "image forming apparatus" of the present disclosure is an MFP in the present embodiment but may be an image forming apparatus other than the MFP, for example, a machine exclusively for a printer.

What is claimed is:

1. An image forming apparatus being capable of printing an image by switching between a normal mode and an economy mode in which toner usage is more reduced than in the normal mode, the image forming apparatus comprising:
   a printer;
   a storage device that stores a color conversion program, a normal mode color conversion table, and an economy mode color conversion table; and
   a central processing unit (CPU) as a control section,
   wherein the control section executes the color conversion program to function as:
      a normal mode color conversion section, in printing execution in the normal mode by the image forming apparatus, that converts colors of the image based on the normal mode color conversion table serving as a color conversion table for the normal mode;
      a color specification acceptance section that accepts specification of two colors;
      an economy mode color conversion section, in printing execution in the economy mode by the image forming apparatus, that converts colors of the image based on the economy mode color conversion table serving as a color conversion table for the economy mode; and
      an economy mode color correction section that corrects at least one of the two colors in the image,
   wherein the control section:
   generates a normal mode Voronoi diagram based on a Lab value at a corresponding lattice point of the normal mode color conversion table, for each of 48 ranges obtained by equally dividing a full gamut based on hues;
   stores 48 normal mode Voronoi diagrams in the storage device;
   generates an economy mode Voronoi diagram based on a Lab value at a corresponding lattice point of the economy mode color conversion table, for each of the 48 ranges obtained by equally dividing the full gamut based on the hues;
   stores 48 economy mode Voronoi diagrams in the storage device;
   executes a normal mode process when determining that the normal mode has been specified; and
   executes an economy mode process when determining that the economy mode has been specified,
   wherein the normal mode process comprises:
   converting by the normal mode color conversion section, an RGB value of a pixel included in pixels of the image into a CMYK value based on the normal mode color conversion table; and
   printing on a recording medium by the control section through the printer, the image all pixels of which have been converted from respective RGB values into respective CMYK values,
   wherein the economy mode process comprises:
   accepting by the color specification acceptance section, specification of the two colors in the image specified by a user, the specification of one of the two colors being accepted as a reference color, and the specification of another one of the two colors being accepted as a candidate corrected color;
   executing by the economy mode color correction section, a color correction process for correcting the candidate corrected color;
   converting by the economy mode color conversion section, an RGB value of a pixel included in the pixels of the image into a CMYK value based on the economy mode color conversion table; and
   printing on a recording medium by the control section through the printer, the image all the pixels of which have been converted from the respective RGB values into respective CMYK values, and
   wherein the color correction process performed by the economy mode color correction section comprises:
   converting RGB values of the reference color and the candidate corrected color into Lab values based on the normal mode color conversion table;
   searching for Voronoi regions in the normal mode Voronoi diagrams respectively corresponding to the reference color and the candidate corrected color that have been converted into the Lab values;
   converting the RGB values of the reference color and the candidate corrected color into Lab values based on the economy mode color conversion table;
   searching for Voronoi regions in the economy mode Voronoi diagrams respectively corresponding to the reference color and the candidate corrected color that have been converted into the Lab values;
   determining whether or not the searched two Voronoi regions corresponding to the reference color and the candidate corrected color in the normal mode Voronoi diagrams are the same regions;
   determining, when determining that the searched two Voronoi regions corresponding to the reference color and the candidate corrected color in the normal mode Voronoi diagrams are not the same regions, whether or not the searched two Voronoi regions corresponding to the reference color and the candidate corrected color in the economy mode Voronoi diagrams are the same regions;

correcting, when determining that the searched two Voronoi regions corresponding to the reference color and the candidate corrected color in the economy mode Voronoi diagrams are the same regions, the Lab value of the candidate corrected color in the economy mode Voronoi diagram; and converting the corrected Lab value of the candidate corrected color in the economy mode Voronoi diagram, into an RGB value based on the economy mode color conversion table.

* * * * *